Oct. 13, 1942.   A. J. LARRECQ   2,298,625
ELASTIC FLUID POWER PLANT
Filed March 6, 1941
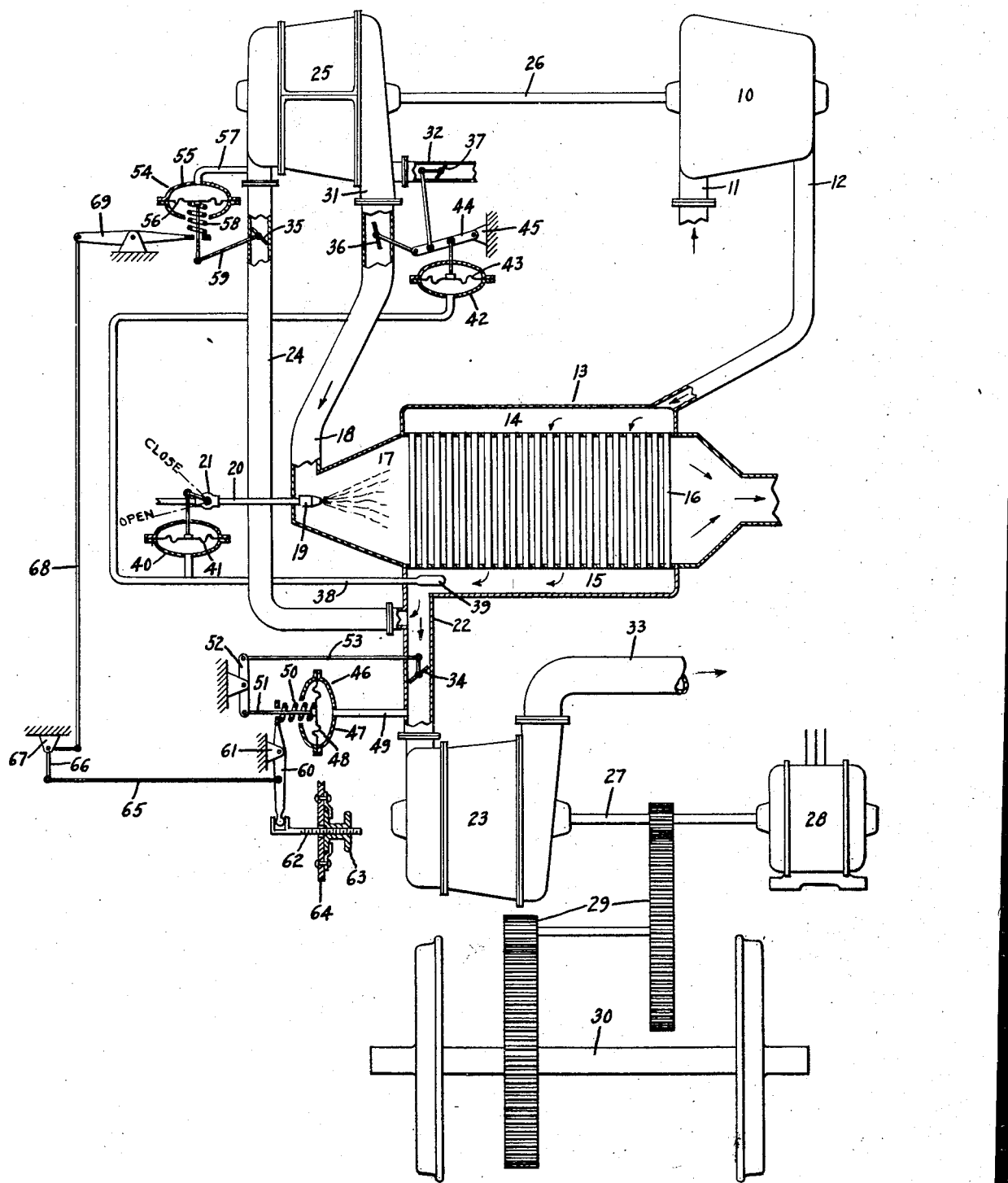
Inventor:
Anthony J. Larrecq,
by Harry E. Dunham
Their Attorney.

Patented Oct. 13, 1942

2,298,625

UNITED STATES PATENT OFFICE 2,298,625

ELASTIC FLUID POWER PLANT

Anthony J. Larrecq, Indianapolis, Ind., assignor to General Electric Company, a corporation of New York Application March 6, 1941, Serial No. 381,940

5 Claims. (Cl. 60—59)

The present invention relates to elastic fluid power plants, more specifically to the type of power plants including a plurality of gas turbines and a source of compressed gas for the turbines.

The object of my invention is to provide an improved construction and arrangement of elastic fluid power plants of the type above specified which may be operated economically and efficiently.

For a consideration of what I believe to be novel and my invention, attention is directed to the following description and the claims appended thereto in connection with the accompanying drawing.

The single figure of the drawing illustrates diagrammatically an elastic fluid power plant embodying my invention.

The arrangement comprises an elastic fluid generator in the form of an air compressor 10 having an inlet conduit 11 for receiving air from the atmosphere and a discharge conduit 12 for discharging compressed air. The air discharged through the conduit 12 in accordance with my invention is heated in a heat-exchange device or surface type heat exchanger 13 which in the present example has upper and lower headers 14, 15 connected by a row of heating tubes 16 and a combustion chamber 17 for producing a heating medium to be passed across the heating tubes 16. The combustion chamber 17 is connected to a conduit 18 for receiving air to maintain combustion and to a source of fuel, in the present instance including an oil burner 19 having a supply pipe 20 including a valve 21 for controlling the flow of fuel or oil therethrough.

The compressed air in the compressor discharge conduit 12 is conducted to the upper header 14, whence it flows through the heating tubes 16 into the lower header 15 to be discharged from the latter into a conduit or channel 22. Thus, the upper header 14, the tubes 16 and the lower header 15 broadly constitute a first channel for receiving air or like gas to be heated, whereas the combustion chamber 17 and the space between the tubes 16 constitute a second channel for receiving heating medium in heat-transferring relationship with the first mentioned channel.

The discharge conduit 22 of the surface type heat exchanger 13 according to my invention is connected to a gas or air turbine 23 and has a branch 24 connected to another gas or air turbine 25. The latter has a shaft 26 connected to drive the compressor 10, whereas the turbine 23 has a shaft 27 for driving a generator 28 and through a gearing 29 a locomotive axle 30. Thus, a part of the heated compressed gas discharged from the device 13 is used in a gas turbine 25 for operating the compressor 10 and another part of the heated compressed gas discharged from the device 13 is used for operating a turbine 23 to furnish useful load or the net output of the plant. In the present example the net output is the mechanical load transferred to the axle 30 and to the generator 28.

The turbine 25 for driving the compressor 10 has an exhaust end 31 which in accordance with my invention is connected to the aforementioned conduit 18 for conducting air to the combustion chamber 17 in order to maintain combustion therein. The exhaust end 31 is provided with a bypass conduit 32 whereby part of the exhaust may be connected to the atmosphere or other point. The turbine 23 is connected to an exhaust conduit 33 for conducting exhaust air or gas to the atmosphere or if desired to a consumer, not shown, for regaining any available energy contained in the exhaust gas.

Summarizing, the arrangement so far described includes a compressor 10 for producing compressed air. The compressed air is heated in a surface type heat-transfer device 13 and the heated compressed air is conducted from the device 13 to two separate turbines 25 and 23. The exhaust air from one of these turbines, in the present instance from the compressor turbine 25, is conducted to a combustion chamber 17 of the surface type heat exchanger 13 in order to burn oil, coal, or like fuel and thereby produce the necessary heating medium for the compressed air conducted to the device 13.

The operation of the turbines 23, 25 with heated compressed air substantially eliminates corrosion, fouling, and erosion normally caused by other operating fluids for elastic fluid turbines. This is an important advantage of my invention in that it prolongs considerably the life of these turbines, and assures operation at maximum efficiency.

The operation of the turbines and the heat exchanger 13 is controlled by a control mechanism which includes several valves for controlling the flow of fluid through the various conduits. Thus, a valve 34 is provided in the conduit 22 behind the connection with the conduit 24 as regards the direction of flow through the conduit 22 for controlling the flow of gas to the power turbine 23 or, from another viewpoint, for controlling the ratio of flow through the turbines 23 and 25. Another valve 35 is provided in the conduit 24 to control the flow of fluid to the turbine 25. Finally, valves 36 and 37 are provided in the conduits 18 and 32 respectively to control the flow of combustion air to the heat exchanger 13 and to the atmosphere or, from another viewpoint, to control the ratio of flow of exhaust gas through the conduits 18 and 32.

It is important to maintain the temperature at the inlet of the gas turbines 23 and 25 substantially constant at all loads. To this end temperature responsive means are provided for controlling the fuel valve 21 and the aforementioned valves 36, 37 in response to temperature changes of the heated compressed air discharged from the heat exchanger 13. The device includes a tube 38 containing a fluid and having a sealed end 39 located in the discharge end of the heat exchanger 13. The tube 38 is connected to a casing 40 including a diaphragm 41 for moving the valve 21 and to another casing 42 including a diaphragm 43 connected to an intermediate point of a lever 44 held at its right-hand end on a fulcrum 45 and having left-hand portions connected to the valve 36 in the conduit 18 and to the valve 37 in the conduit 32. With increasing temperature of the heated compressed gas in the lower header 15 the fluid sealed into the conduit 38 expands and thereby causes upward movement of the diaphragms 41 and 43. Upward movement of the diaphragm 41 effects closing movement of the valve 21 to reduce the flow of fuel to the combustion chamber 17 and upward movement of the diaphragm 43 causes closing movement of the valve 36 and opening movement of the valve 37 whereby the flow of air through the conduit 18 to the combustion chamber 13 is decreased and the flow of air through the bypass conduit 32 to the atmosphere is increased. This results in decreased flow of heating medium to the heat exchanger 13 and accordingly decreased heat transfer through the tube 16 to the compressed air.

The valve 34 which, as stated above, controls the ratio of flow to the turbines 23 and 25 is connected to a mechanism responsive to pressure changes in the inlet of the turbine 23. This mechanism comprises a pressure responsive device 46 having a casing 47 with a diaphragm 48 and connected by a pipe 49 to the conduit 22 near the inlet of the turbine 23. The diaphragm is biased by a spring 50 against the pressure of the air in the right-hand half of the casing 47. A stem 51 secured to the diaphragm 48 is connected through a fulcrumed lever 52 to a link 53 for moving the valve 34.

During operation an increase in pressure of the air conducted to the turbine 23 causes the pressure responsive device 46 to turn the lever 52 clockwise against the biasing force of the spring 50 whereby the valve 34 is turned towards closing position, thus reducing the pressure in the inlet of the turbine 23 and maintaining said pressure substantially constant during varying load conditions. The valve 35 in the inlet conduit for the compressor turbine 25 is similarly controlled by a pressure responsive device 54 in response to pressure changes of the air in the inlet of the turbine 25. The device 54 has a casing 55 with a diaphragm 56. The upper half of the casing 55 is connected by a pipe 57 to the inlet of the turbine 25. The diaphragm 56 is biased by a compression spring 58 and connected to a link 59 for moving the valve 35.

During operation an increase in pressure of the fluid in the inlet of the turbine 25 causes downward movement of the diaphragm 56 against the biasing force of the spring 58, thereby moving the valve 35 towards closing position to throttle the flow of fluid conducted through the conduit 24 to maintain substantially constant the fluid pressure in the inlet of the compressor turbine 25.

The output of the power turbine 23, that is, the turbine furnishing the net load, may be varied by positioning the throttle valve 34. In order to maintain substantially constant the temperature of the compressed fluid upon such variation it is necessary simultaneously to vary the output of the compressor turbine 25 by properly positioning the inlet valve 35. This is accomplished by the provision of a mechanism for simultaneously setting or varying the compression of the springs 50 and 58 of the pressure responsive devices 46 and 54 respectively. This mechanism includes a lever 60 held on a fulcrum 61 and having an upper end engaging the outer end of the spring 55. The lower end of the lever is loosely connected to a screw 62 which in turn is engaged by a handwheel 63 held on a fixed support 64. Rotation of the handwheel 63 which is threaded onto the screw 62 causes axial movement of the screw whereby the lever 60 is turned about its fulcrum and changes the compression of the spring 50. The intermediate point of the lever 60 is connected by a link 65 to an arm of a bell crank lever 66 held on a fulcrum 67 and having another arm connected by a link 68 to the left-hand end of a fulcrumed lever 69 which has a right-hand end engaging the lower end of the spring 58.

During operation the load output of the turbine 23 may be increased by turning the handwheel 63 so as to effect clockwise turning movement of the fulcrumed lever 60, thus increasing the compression of the spring 50 and opening the inlet valve 34 for the power turbine 23. Clockwise turning movement of the fulcrumed lever 60 causes through the link 65, the bell crank 66 and the link 68 counterclockwise turning movement of the fulcrumed lever 69 whereby the compression of the spring 58 is likewise increased and the inlet valve 35 of the compressor turbine is opened, resulting in increased speed of the turbine 25 and the compressor 10 and increased compression of the air discharged from the latter. The increased flow of air to the heat exchanger 13 will cause a drop in temperature, thereby causing the temperature responsive devices 38, 40, 42 to increase the flow of fuel and air to the combustion chamber 17 of the heat exchanger 13.

If it is desired to decrease the output of the power turbine 23 the handwheel 63 is moved in opposite direction to reduce the compression of the springs 50 and 58 of the pressure responsive devices 46 and 54 respectively.

Although not shown the gear turn connecting with the mechanical load may include a reversing mechanism.

What I claim as new and desire to secure by Letters Patent of the United States is:

1. Elastic fluid power plant comprising a compressor for compressing air, a surface type heat exchanger having a first channel connected to receive compressed air from the compressor and a second channel in heat-transferring relationship with the first channel for receiving heating medium, a compressor turbine for driving the compressor connected to receive heated compressed air from the first channel, a power turbine connected in parallel with the compressor turbine, means for producing heating medium including a combustion chamber forming part of the heat exchanger, means for conducting fuel to the chamber and a conduit for conducting air exhausted from the compressor turbine to the combustion chamber, and means for controlling the flow of air through said conduit including a valved bypass connected to the conduit.

2. Elastic fluid power plant comprising a compressor for compressing air, a surface type heat exchanger having a first channel connected to receive compressed air from the compressor and a second channel in heat-transferring relationship with the first channel for receiving heating medium, a compressor turbine for driving the compressor connected to receive heated compressed air from the first channel, a power turbine connected in parallel with the compressor turbine, means for supplying heating medium to the second channel including a combustion chamber, means for supplying fuel to the chamber and a conduit for conducting air exhausted from one of the turbines to the combustion chamber, means for controlling the flow of air through said conduit including a valved bypass connected to the conduit, and means including a device responsive to temperature changes in the outlet of the first channel for controlling the valved bypass and the fuel supply means.

3. Elastic fluid power plant comprising an air compressor, a surface type heat exchanger having a first channel connected to the air compresor and a second channel for receiving heating medium, a compressor turbine and a power turbine having inlet conduits connected in parallel to the discharge end of the first channel, valve means in the inlet conduits, and devices responsive to pressure changes connected to the inlets of the turbines behind the valve means as regards the direction of flow therethrough for controlling the valve means.

4. Elastic fluid power plant comprising an air compressor, a surface type heat exchanger having a first channel connected to the air compressor and a second channel for receiving heating medium, a compressor turbine and a power turbine having inlet conduits connected in parallel to the discharge end of the first channel, valve means in the inlet conduits, devices responsive to pressure changes in the inlets of the turbines for controlling the valve means, and means for simultaneously adjusting the pressure responsive devices to vary the output of the power turbine.

5. Elastic fluid power plant comprising an air compressor, a surface type heat exchanger having a first channel connected to the air compressor and a second channel for receiving heating medium, a compressor turbine and a power turbine having inlet conduits connected in parallel to the discharge end of the first channel, valve means in the inlet conduits, devices responsive to pressure changes in the inlets of the turbines for controlling the valve means, means for simultaneously adjusting the pressure responsive devices to vary the output of the power turbine, means for supplying heating medium to the second channel of the heat exchanger including a combustion chamber, a conduit with a valved bypass connecting the combustion chamber to the exhaust end of the compressor turbine, means for supplying fuel to the combustion chamber, and devices responsive to temperature changes in the outlet of the first channel for automatically adjusting the fuel supply means and the valved bypass.

ANTHONY J. LARRECQ.